United States Patent Office 3,412,048
Patented Nov. 19, 1968

3,412,048
FLAME RETARDANT POLYURETHANES
Alec V. Mercer, Heald Green, and Janet E. Jones, Sale, England, assignors to Shell Oil Company, New York, N.Y., a corporation of Delaware
No Drawing. Filed Mar. 8, 1965, Ser. No. 438,081
Claims priority, application Great Britain, Mar. 11, 1964, 10,262/64
6 Claims. (Cl. 260—2.5)

ABSTRACT OF THE DISCLOSURE

Flame retardant rigid polyurethane foams having satisfactory humid aging properties are prepared by reacting an organic polyisocyanate or polyisothiocyanate with a hydroxy reactant consisting essentially of (1) a phosphorus-containing polyol, (2) an epichlorohydrin-based polyol and (3) a non-halogen-containing polyether polyol, said hydroxy reactant containing from 1 to 2% by weight phosphorus and from 10 to 20% by weight halogen.

---

This invention relates to polyurethanes and to their preparation. More particularly, the invention relates to flame retardant polyurethane foam having satisfactory humid aging properties.

Polyurethanes have been prepared in several forms. One form of the polyurethane is a polymeric material, often referred to for convenience as polyurethane "prepolymer," which is obtained by reacting an organic polyfunctional isocyanate or a polyfunctional isothiocyanate with an organic compound containing in the molecule a plurality of active, hydrogen atoms (as determined by the Zerewitinoff method, J.A.C.S., vol. 49, p. 3181, 1927), such as, for example, an organic polyhydroxy compound. While such prepolymers are in themselves useful polymeric materials, for example, prepolymers can be molded or cast into sheets or converted into synthetic rubbers, such as prepolymers are at present particularly useful as intermediates for the production of another form of polyurethane, namely, a cross-linked polyurethane which for convenience of description is referred to herein as a polyurethane "plastic." Such polyurethane plastics can be prepared from prepolymers either (a) by reacting a prepolymer which contains free isocyanato or isothiocyanato radicals with a compound containing in the molecule a plurality of active hydrogen atoms or (b) by reacting with a polyisocyanate or a polyisothiocyanate, a prepolymer which contains active hydrogen atoms but which substantially does not contain free isocyanato or isothiocyanato radicals. In the second-mentioned case the prepolymer will usually contain active hydrogen atoms in the form of hydroxyl groups. The polyisocyanates and polyisothiocyanates referred to herein are organic compounds of the general formula $R(NCX)_{n+1}$, wherein R represents an organic radical, X represents an oxygen atom or a sulfur atom and $n$ is a positive integer having a value 1, 2, 3, 4, etc.

It is also possible to prepare polyurethane plastics directly by reacting an organic polyisocyanate or polyisothiocyanate with an organic compound or compounds containing in the molecule a plurality of active hydrogen atoms under such conditions that the desired cross-linked polyurethane plastic is formed. This direct method of preparation is often referred to in the art as the single-stage or "one-shot" method, and from the manufacturing point of view it is often to be preferred to the two-stage method involving, as the first stage, the preparation of a prepolymer.

The polyurethane plastics are particularly useful when in the form of the cellular materials commonly known as polyurethane foams which, depending upon their physical properties, find particular application as insulating and shock-absorbing materials which may be used for many purposes in industry. Depending on the nature of the starting materials and the conditions under which the polyurethane foams are prepared it is possible to produce rigid foams suitable, for example, for heat insulation and resilient foams of various degrees of resilience suitable, for example, for shock absorption and for seat coverings, carpet underlays and many other purposes including, in the case of open-cell resilient foams, sound insulation. In general, polyurethane foams can be prepared by "blowing" the reaction mixture during the conversion of a prepolymer into a polyurethane plastic, or, in the case of the one-shot method, by blowing the reaction mixture in which the polyurethane plastic is produced directly from starting materials comprising a polyisocyanate or polyisothiocyanate and an organic compound having in the molecule a plurality of active hydrogen atoms. In either case blowing can be accomplished for example by such techniques as generating a gaseous blowing agent, e.g., carbon dioxide in situ in the reaction mixture or by supplying a gaseous blowing agent such as air thereto. In the case of the one-shot method, the reactants are usually mixed in a so-called mixing head fitted with a stirrer capable of rotation at speeds of the order of 2000 to 5000 r.p.m. In addition to promoting rapid and thorough mixing of the reactants the action of the stirrer also aids foam formation.

Polyurethanes which are flame retardant are highly desirable and required for many applications and particularly in the building industry. Previously fire retardancy has been attempted by the incorporation of additives such as tris-beta-chloroethyl phosphate and antimony oxide into the foam. However, foams containing these additives lose their flame-retardant properties and deteriorate generally with age. In addition, such foams have in the past failed to possess humid aging properties, thus rendering them unsuitable for many applications.

It is the principal object of this invention to provide polyurethane foams which not only have improved flame retardant properties, but also have improved dimensional stability under humid conditions. These and other objects will become apparent from the following disclosure. Unless otherwise stated, the term "polyurethane" is used in the specification to include polyurethane foams.

It has now been found if a polyurethane is prepared from a hydroxy reactant which contains between 1 and 2% phosphorus by weight and between 10 and 20% halogen by weight the polyurethane has in addition to the flame-retardant properties, satisfactory humid aging properties.

The polyurethanes of this invention contain both halogen atoms and phosphorus atoms in the molecular structure and are prepared by reacting an organic polyisocyanate or organic polyisothiocyanate with a hydroxy reactant having from 1 to 2% by weight phosphorus by weight and from 10 to 20% halogen by weight.

The organic polyfunctional isocyanates or isothiocyanates used to prepare the polyurethanes are those having the general formula $R(NCX)_{n+1}$, wherein R represents a polyvalent organic radical, X represents an oxygen or sulfur atom and $n$ is an integer of at least 1, i.e., 1, 2, 3, 4, etc.

The organic polyisocyanate or polyisothiocyanate may be an aliphatic, cycloaliphatic or aromatic compound or a derivative thereof provided any such derivative contains no substituent which interferes with the reaction. Thus, if desired, it may be used in the form of a functional derivative containing "masked" or "blocking" isocyanato or isothiocyanato groups, free isocyanato or isothiocyanato groups being formed from "masked" or "blocked" groups by the action of heat. Examples of such functional derivatives include dissociable polymers such as dimers; dissociable addition products of organic polyisocyanates or polythiocyanates with phenol, and non-dissociable addition products of organic polyisocyanates or polyisothiocyanates with suitable aliphatic polyhydroxy compounds, such as, for example, dimethylol propane, trimethylol propane and glycerol. It should be noted that in the non-dissociable addition products certain free isocyanato or isothiocyanato groups are present, but they are sterically hindered to such a degree that they are substantially unreactive at ordinary room temperatures, though they can react at a useful rate if heat is applied. The dissociable polymers and dissociable and non-dissociable addition products can be useful in reducing toxicity risks.

Advantageously, a difunctional organic isocyanate is used. Examples of suitable isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanates, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisothiocyanate; cyclo alkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanates, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, 4,4'-diphenylenemethane diisocyanate, 4,4'-diphenylenepropane diisocyanate, xylylene-1,4-diisothiocyanate or durene diisocyanate. While any polyisocyanate or polyisothiocyanate of the general formula $R(NCX)_{n+1}$ may be employed, aromatic diisocyanates are preferred. Toluene diisocyanate or isomeric mixtures thereof are preferred for production of flexible or semi-rigid foams and p,p'-diphenylmethane diisocyanate is preferred for rigid polyurethane foam production.

The hydroxy reactant which contains the phosphorus and halogen and which is reacted with the organic polyisocyanate or polyisothiocyanate according to the invention is selected from:

(1) A phosphorus and halogen-containing polyol;
(2) A binary blend of
  (a) a phosphorus-containing polyol which may or may not contain halogen and
  (b) a polyether polyol or a polyester polyol which may or may not contain halogen but which does contain halogen if the phosphorus-containing polyol (2a) does not;
(3) A ternary blend of
  (a) a phosphorus containing polyol which may or may not contain halogen and
  (b) a polyether polyol or polyester polyol which does not contain halogen and
  (c) a polyether polyol or polyester polyol which does contain halogen.

Thus, if the phosphorus-containing polyol does have halogen in its molecular structure, the hydroxy reactant in addition to the phosphorus-containing polyol may optionally consist of a polyol that does or does not contain halogen. If the phosphorus-containing polyol does not have halogen in its molecular structure, the hydroxy reactant consists of in addition to the phosphorus-containing polyol, a halogen-containing polyol and, optionally, a non-halogen containing polyol.

The phosphorus-containing polyols which are used in preparing the polyurethanes of the invention are those derived from phosphorus, phosphonic, and phosphoric (including pyrophosphoric) acids. The polyols of these acids may be prepared by a number of ways, such as by reacting the acids with alkylene oxides, or halogen substituted alkylene oxides, or by esterification of the acids, or transesterification of acid esters with polyalkylene glycols and polyoxyalkylene glycols.

The preferred phosphorus-containing polyols are of the general formulae

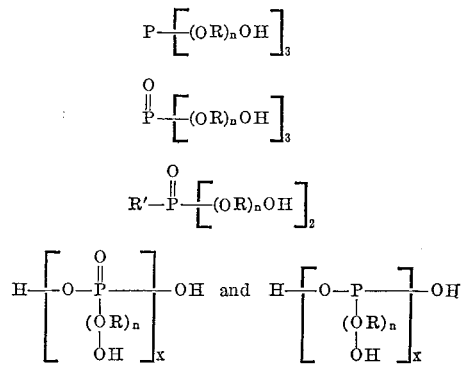

wherein R is an alkylene radical preferably from 2 to 4 carbon atoms and may be halogen substituted, R' is an aliphatic or aromatic hydrocarbyl radical preferably from 1 to about 20 carbon atoms, $n$ is an integer of from 2 to about 35 and $x$ is an integer of from 1 to about 20.

Examples of suitable phosphorus-containing polyols which contain halogen in the molecule are phosphoric, phosphonic, and phosphorus acid—propylene oxide—epichlorohydrin adducts. Phosphorus-containing polyols which do not contain halogens include triols such as tris-dipropylene glycol phosphite and tris-dipropylene glycol phosphate, tetrols such as dipropylene glycol pentol triphosphite and dipropylene glycol pentol triphosphate. The preferred phosphorus-containing polyols are tris-dipropylene glycol phosphite, tris-dipropylene glycol phosphate and phosphoric acid—propylene oxide adducts.

In addition to the phosphorus-containing polyol, as set forth above the hydroxy reactant may also consist of at least one polyol that is a polyether polyol and/or a polyester polyol which may or may not contain halogen depending on whether the phosphorus-containing polyol contains halogen.

The polyether polyols which can be used in the present invention may be addition products, or adducts, which contain in their molecular structure a plurality of active hydrogen atoms capable of reacting with isocyanato or isothiocyanato radicals, said adducts being prepared by the reaction of an alkylene oxide and/or a halo-substituted alkylene oxide with a compound containing in its molecular structure at least two active hydrogen atoms (such a compound is hereinafter sometimes referred to as nucleating agent). A polyether polyol can be prepared, for example, by the reaction of an alkylene oxide and/or a halo-substituted alkylene oxide with a nucleating agent to give an adduct wherein at least two of the active hydrogen atoms of the nucleating agent are replaced by hydroxy-terminated polymeric chains containing oxyalkylene and/or halo-substituted oxyalkylene radicals. Among the alkylene oxides which can be used in preparing the polyether polyols which are used in carrying out the process of the present invention, are ethylene oxide, propylene oxide and 1-butene oxide and among the halo-substituted alkylene oxides which can be used are epichlorohydrin, epibromohydrin and 2-methylepichlorohydrin. Examples of the nucleating agents which can be used are water, monopropylene glycol, glycerol, sorbitol and sucrose.

Examples of suitable polyether polyols which contain halogen are diols such as polyepichlorohydrins, triols such as glycerol-epichlorohydrin and glycerol-epichlorohydrin-propylene oxide adducts, and hexols such as sorbitol-epichlorohydrin-propylene oxide adducts. Examples of suitable polyether polyols which do not contain halogen are diols such as polyethylene and polypropylene glycols and polyoxypropylene glycols, triols such as glycerol-propylene oxide adducts, hexols such as sorbitol-propylene oxide adducts, and octols such as sucrose-propylene oxide adducts.

Examples of suitable polyester polyols are those such as prepared by the reaction of a polycarboxylic compound with a polyhydric alcohol, polycarboxylic compound being polycarboxylic acid, a polycarboxylic acid anhydride, a polycarboxylic acid halide, or a mixture thereof. Halogen-containing polyester polyols can be prepared if either the polycarboxylic compound or the polyhydric alcohol contains halogen in its molecular structure, though it will be appreciated that if a halogen-containing polyester polyol is prepared by the reaction of polycarboxylic acid halide with a polyhydric alcohol which does not contain halogen in its molecular structure, the polycarboxylic acid from which said polycarboxylic acid halide is derived must contain halogen in its molecular structure. Among the polycarboxylic compounds which can be used for the preparation of polyester polyols are succinic acid, adipic acid, phthalic acid, and tetrachlorophthalic acid.

The non-phosphorus containing polyols are preferably polyether polyols.

Specific examples of the hydroxy reactant compositions used in carrying out the present invention are:

(1) a phosphorus-containing polyol which contains halogen in its molecular structure, for example, a phosphoric acid-propylene oxide-epichlorohydrin adduct;
(2) a binary blend of a phosphorus-containing polyol which contains halogen in its molecular structure, for example, a phosphoric acid-propylene oxide-epichlorohydrin adduct, and a halogen-containing polyether polyols such as, for example, either (a) a glycerol-epichlorohydrin-propylene oxide adduct or (b) a sorbitol-epichlorohydrin-propylene oxide adduct;
(3) a binary blend of a sorbitol-epichlorohydrin-propylene oxide adduct and either (a) a phosphoric acid-propylene oxide adduct or (b) a phosphoric acid-epichlorohydrin adduct.

The preferred hydroxy reactant compositions are ternary blends such as:

(4) a ternary blend of a sorbitol-propylene oxide adduct, a glycerol-epichlorohydrin adduct and either (a) a phosphoric acid-epichlorohydrin adduct or (b) a phosphoric acid-propylene oxide adduct;
(5) a ternary blend of a phosphoric acid-epichlorohydrin adduct, glycerol-epichlorohydrin adduct and a glycerol-propylene oxide adduct.

Especially preferred ternary blends are:

(6) a phosphoric acid-propylene oxide adduct, a glycerol-epichlorohydrin adduct and either a glycerol-propylene oxide adduct or a sucrose-propylene oxide adduct;
(7) tris-dipropylene glycol phosphite, a glycerol-epichlorohydrin adduct and either a glycerol-propylene oxide adduct or a sucrose-propylene oxide adduct;
(8) tris-dipropylene glycol phosphate, a glycerol-epichlorohydrin adduct and either a glycerol-propylene oxide adduct or a sucrose-propylene oxide adduct.

The hydroxy reactant used in carrying out the present invention contains between 1 and 2 percent by weight phosphorus and between 10 and 20 percent by weight halogen, and preferably between 1.4 and 1.6 percent by weight phosphorus and between 10 and 20 percent by weight halogen and more preferably between 1.4 and 1.6 percent by weight phosphorus and between 10 and 15 percent by weight halogen.

The organic polyisocyanate or polyisothiocyanate and the hydroxy reactant are preferably reacted in a stoichiometric ratio (i.e., one isocyanato or isothiocyanato group for every active hydroxy group) or with a slight molar excess (up to about 10%) of either reactant.

In order to increase the rate of reaction between the organic polyisocyanate and/or organic polyisothiocyanate and the hydroxy reactant, the reaction is normally carried out in the presence of a catalyst, in particular, a tertiary amine such as triethylene diamine. A polyurethane having a foamed structure, i.e., a polyurethane foam is obtained as the result of the in situ evolution of a gas in the chemical reaction leading to polyurethane formation, or by the vaporization of a volatile liquid foaming agent such as the fluorochlorohydrocarbons, incorporated in the reaction mixture, or by a combination thereof. A foam stabilizer such as silicone oil is often incorporated into the reaction mixture.

In preparing preferred rigid foams in accordance with the present invention the hydroxyl number of the hydroxy reactant is about 350 and about 650 mg. potassium hydroxide/g. and preferably between 400 to 600 mg. potassium hydroxide/g.

The following examples are provided to illustrate the manner in which the invention is carried out. It is to be understood that the examples are for the purposes of illustration only and the invention is not to be regarded as limited to any of the specific compounds or conditions recited therein. Unless otherwise indicated, parts disclosed in the examples are given by weight.

The present invention may be illustrated by the following examples in which polyurethane foams were obtained by reacting the hydroxy reactant composition with technical p,p'-diphenylmethane diisocyanate which is known under the trade designation "Caradate 30" and the foamed structure of the polyurethane foam was obtained by the foaming up of the reaction mixture as a result of either the evolution of carbon dioxide formed in the chemical reaction leading to polyurethane formation or by the vaporization of trichlorofluoromethane which is known under the trade designation "Isceon 11." The reaction mixture used in preparing the polyurethane foams was:

| | |
|---|---|
| Hydroxy reactants _____parts by weight__ | 100 |
| Triethylene diamine _____do____ | 0.5 |
| Triethylene _____do____ | 1.5 |
| Silicon Oil L500 (a water soluble silicon copolymer of moderate viscosity—Union Carbide Chemical Co.) _____parts by weight__ | 1.0 |
| "Caradate 30" _____percent molar excess__ | 10 |
| and either | |
| Water _____parts by weight__ | 4.0 |
| or | |
| "Isceon 11" _____do____ | 40 |

The 10 percent molar excess of "Caradate 30" was based on the total number of active hydrogen atoms in the reaction mixture which are capable of reacting with the organic polyisocyanate. The flame-retardancy of the polyurethanes was determined using the ASTM test No. D–1692–59T. The dimensional stability under conditions of humid aging was determined by exposing a piece of polyurethane foam with the dimensions 6 inches x 1 inch x 1 inch to a relative humidity of 100 percent and a temperature of 100° F. for 168 hours and measuring the percentage increase in length. The flame-retardancy and humid aging properties of the polyurethanes are summarized in the table.

EXAMPLE I

In this example the hydroxy reactant was a blend of 69.2 parts by weight tris-dipropylene glycol phosphite and 30.8 parts by weight of a glycerol-propylene oxide of approximate molecular weight of about 300. The hydroxy reactant provided 5% by weight phosphorus, and the "Isceon" blown foam prepared therefrom was self-extinguishing but showed unsatisfactory distortion under the conditions of humid aging.

EXAMPLES II to IV

In these examples the hydroxy reactant was a glycerol-epichlorohydrin-propylene oxide adduct providing more than 20% chlorine. While the resulting polyurethanes were flame-retardant the humid aging properties were unsatisfactory and the foams were considerably scorched during preparation.

EXAMPLE V

The hydroxy reactant in this example was a blend of a phosphoric acid-epichlorohydrin adduct and a glycerol-propylene oxide adduct having a molecular weight of about 300.

EXAMPLE VI

The hydroxy reactant was a blend of a phosphoric acid-epichlorohydrin adduct, a glycerol-propylene oxide adduct of a molecular weight of 300 and a glycerol-epichlorohydrin adduct of a molecular weight of 400.

EXAMPLES VII to XVII

These examples show that if the hydroxy reactant provides between 1 and 2 percent by weight phosphorus and between 10 and 20 percent by weight halogen, the polyurethanes prepared therefrom are self-extinguishing and have good dimensional stabilities under conditions of humid aging.

The hydroxy reactant comprised a ternary blend of phosphorus-containing polyols, a glycerol-propylene oxide adduct of approximate molecular weight 300 and a glycerol-epichlorohydrin adduct of approximate molecular weight 400. In Examples VII to IX the phosphorus-containing polyol was a phosphoric acid-propylene oxide adduct prepared by reacting phosphoric acid with a stoichiometric excess of propylene oxide necessary to completely esterify the acid and contained 5.7% phosphorus and had a hydroxyl number of 403 (mg. KOH/g.). In Examples X and XI the phosphorus-containing polyol was tris-dipropylene glycol phosphite and in Examples XII and XIII it was tris-dipropylene glycol phosphate. In Example XIV the phosphorus-containing polyol was dipropylene glycol tetrol diphosphate and in Example XV the phosphorus-containing polyol was dipropylene glycol pentol triphosphate.

EXAMPLE XVI

The hydroxy reactant comprised a blend of a phosphoric acid-propylene oxide adduct used in Examples VII–IX, a glycerol-epichlorohydrin adduct of approximate molecular weight 400 and a polyoxyalkylene glycol having a molecular weight of 691 and a hydroxyl No. of 487.6 (Pluracol SP 760, Wyandotte Chemical Corporation).

EXAMPLE XVII

The hydroxy reactant comprised a blend of a phosphoric acid-propylene oxide adduct used in Examples VII–IX and sorbitol-propylene oxide-epichlorohydrin adduct having 23 percent chlorine and a hydroxyl number of 442 (mg. KOH/g.).

EXAMPLES XVIII and XIX

The hydroxy reactant was an adduct, prepared by reacting a mixture of propylene oxide and epichlorohydrin with a mixture of phosphoric acid and sorbitol using boron trifluoride as the catalyst, the product having 2.4% P, 15.9% Cl, hydroxyl number 465 (mg. KOH/g.).

TABLE

| Ex. | Phosphorus, percent [1] | Chlorine, percent [1] | Blowing Agent | Classification | Length Burned, inches | Increase in Length on Humid Aging, percent |
|---|---|---|---|---|---|---|
| 1 | 5.0 | (2) | "Isceon 11" | SE | 2 | +2.8D |
| 2 |  | 20.8 | Water | SE | 2 | −2.0 |
| 3 |  | 20.8 | "Isceon 11" | SE | 2 | −1.9 |
| 4 |  | 25 | ----do | NB | 0 | +2.8 |
| 5 | 0.75 | 5.5 | Water | (3) |  |  |
| 6 | 0.5 | 11.0 | ----do |  | 5+ |  |
| 7 | 1.4 | 10.0 | ----do | SE | 2¼ | −0.8 |
| 8 | 1.4 | 10.0 | "Isceon 11" | SE | 2¾ | +0.4 |
| 9 | 2.0 | 10.0 | ----do | SE | 2 | +1.2 |
| 10 | 1.4 | 15.0 | Water | SE | 2¾ | −0.7 |
| 11 | 1.4 | 15.0 | "Isceon 11" | SE | 1¾ | +0.7 |
| 12 | 1.4 | 15.0 | Water | SE | 2 | −0.7 |
| 13 | 1.4 | 15.0 | "Isceon 11" | SE | 1½ | +0.7 |
| 14 | 1.4 | 15.0 | Water | SE | 1¼ | −0.8 |
| 15 | 1.4 | 15.0 | ----do | SE | 1¼ | −1.2 |
| 16 | 2.0 | 15.0 | ----do | SE | 2 | +0.4 |
| 17 | 2.0 | 15.0 | ----do | SE | 2½ | +0.3 |
| 18 | 1.5 | 15.0 | ----do | SE | 1½ | (2) |
| 19 | 1.5 | 15.0 | "Isceon 11" | SE | 1½ | +1.1 |

[1] Based on total weight of hydroxy reactant.
[2] Zero.
[3] Burning.
SE = Self-extinguishing.
NB = Non-burning.
D = Distortion.

We claim as our invention:

1. A flame retardant rigid polyurethane foam having satisfactory humid aging properties prepared by reacting an organic polyfunctional compound selected from the group consisting of polyisocyanates and polyisothiocyanates with a hydroxy reactant consisting essentially of a ternary blend of
   (1) a phosphorus-containing polyol selected from the group consisting of a phosphoric acid-propylene oxide adduct, a phosphoric acid-epichlorohydrin adduct, tris-dipropylene glycol phosphite and tris-dipropylene glycol phosphate;
   (2) an epichlorohydrin-based polyol selected from the group consisting of (a) glycerol-epichlorohydrin adducts, (b) glycerol-epichlorohydrin-propylene oxide adducts and (c) sorbitol-epichlorohydrin-propylene oxide adducts and
   (3) a non-halogen-containing polyether polyol selected from the group consisting of polyethylene glycols, polypropylene glycols, polyoxypropylene glycols, glycerol-propylene oxide adducts and sucrose-propylene oxide adducts, said hydroxyl reactant having a hydroxyl number between about 350 and 650 and containing from 1 to 2% by weight phosphorus and from 10 to 20% by weight halogen.

2. A flame retardant rigid polyurethane foam as in claim 1 wherein the organic polyisocyanate is p,p'-diphenylmethane diisocyanate.

3. A flame retardant rigid polyurethane foam as in claim 1 wherein the hydroxy reactant consists of (a) a phosphoric acid-propylene oxide adduct, (b) a glycerol-epichlorohydrin adduct having an approximate molecular weight of 400 and (c) a polyoxyalkylene glycol.

4. A flame retardant rigid polyurethane as in claim 1 wherein the hydroxy reactant consists of (a) a phosphoric acid-propylene oxide adduct, (b) a glycerol-epichlorohydrin adduct having an approximate molecular weight of 400 and (c) a glycerol-propylene oxide adduct having an approximate molecular weight of 300.

5. A flame retardant rigid polyurethane as in claim 1 wherein the hydroxy reactant consists of (a) tris-dipropylene glycol phosphite, (b) a glycerol-epichlorohydrin adduct having an approximate molecular weight of 400 and (c) a glycerol-propylene oxide adduct having an approximate molecular weight of 300.

6. A flame retardant rigid polyurethane as in claim 1 wherein the hydroxy reactant consists of (a) tris-dipropylene glycol phosphate, (b) a glycerol-epichlorohydrin adduct having an approximate molecular weight of 400 and (c) a glycerol-propylene oxide adduct having an approximate molecular weight of 300.

References Cited
UNITED STATES PATENTS

| | | | |
|---|---|---|---|
| 3,263,001 | 7/1966 | Friedman | 260—929 |
| 3,225,010 | 12/1965 | Friedman | 260—77.5 |
| 3,220,961 | 11/1965 | Friedman | 260—2.5 |
| 3,188,341 | 6/1965 | Smith et al. | 260—461 |
| 3,179,629 | 4/1965 | Friedman | 260—77.5 |

DONALD E. CZAJA, *Primary Examiner.*

R. W. MULCAHY, *Assistant Examiner.*